United States Patent [19]

McCloskey

[11] 4,076,343
[45] Feb. 28, 1978

[54] SPHERICAL BEARING ASSEMBLY WITH INSERT MEMBER

[75] Inventor: Albert R. McCloskey, Fairfield, Conn.

[73] Assignee: Heim Universal Inc., Fairfield, Conn.

[21] Appl. No.: 677,870

[22] Filed: Apr. 19, 1976

Related U.S. Application Data

[63] Continuation of Ser. No. 512,132, Oct. 4, 1974, abandoned.

[51] Int. Cl.² .............................................. F16C 23/00
[52] U.S. Cl. ................................ 308/72; 308/189 R; 308/207 R
[58] Field of Search ............... 308/72, 189 R, 193, 308/207 R, 196, 189 A, 207 A

[56] References Cited
U.S. PATENT DOCUMENTS

| 2,906,568 | 9/1959 | Gray | 308/72 |
| 3,687,509 | 8/1972 | Schweizer | 308/72 |

Primary Examiner—Richard A. Bertsch
Attorney, Agent, or Firm—James C. Wray

[57] ABSTRACT

A spherical bearing assembly has a metal inner race member and an outer race member. The inner surface of the outer race member is a concave spherical surface and the outer surface of the inner member is a complementary convex spherical surface. The outer member includes an annular recess the base of which is threaded. The recess is adapted to threadably receive a first yieldable plastic annular ring whose outer surface is threaded with threads complementary to the threads on the base of the recess. A second formable and yieldable annular ring is also received in the recess in a side-by-side relationship with the first annular ring. The inner surface of the first and second annular rings provide approximately one-half of the concave spherical surface of the outer race member. The first annular ring operationally captures the second annular ring and the inner race member within the outer race member.

10 Claims, 5 Drawing Figures

SPHERICAL BEARING ASSEMBLY WITH INSERT MEMBER

This is a continuation of application Ser. No. 512,132, filed Oct. 4, 1974, now abandoned.

BACKGROUND OF THE INVENTION

The present invention relates generally to self-aligning bearings having a ball-like inner member with a convex outer surface and an outer member having an inner surface with a complementary concave spherical inner face. These types of bearings, which are commonly called "spherical bearings," have been utilized in industry for a substantial period of time. The technological evolution of these type bearings has been directed more in terms of material composition of its various component parts rather than toward basic changes in design concepts. Accordingly, the design advances in spherical bearings have not been substantial in nature and thereby presently limiting their applications.

One area in which the spherical bearings have been extensively applied is the aircraft industry. This is due to the spherical bearing self-aligning characteristic. A typical such application is marrying of a spherical bearing to machine tool or to a landing gear strut or member of an airplane. In these types of applications the outer race is commonly press-fitted and/or staked into a housing or the like, rendering it difficult to remove and/or maintain. When any such maintenance is required, such as replacing of the ball, the entire bearing assembly including the inner and outer race member would have to be removed and replaced by an entirely new bearing assembly. Such an operation could entail substantial expense and down time of the entire machine tool or aircraft.

There are a number of prior art type spherical bearings which have been addressed to this kind of problem. One such type prior art bearing is the "messerschmidt" bearing. A concept of this bearing is that the ball can be removed in the field without disassembling the entire bearing, that is, removing the outer race member from its mounting. The messerschmidt type spherical bearing has proved somewhat unsatisfactory in that its overall bearing surface is decreased by the provision of a slot. This decrease or rather limited bearing surface area has a marked negative effect on the bearing performance characteristics.

SUMMARY OF THE INVENTION

It is therefore, a primary object of the present invention to provide a spherical bearing assembly having an inner race member and an outer race member, the inner surface of the outer race member being a concave spherical surface, the outer surface of the inner member being a complementary convex spherical surface, the outer member including an annular recess the base of which is threaded, said recess being adapted to threadably receive a first annular ring whose outer surface is threaded with threads complementary to the threads on the base of said recess, the inner surface of said first annular ring providing approximately one-half of the concave spherical surface of said outer race member, said first annular ring operationally capturing said inner race member within said outer race member.

It is another object of the present invention to provide a spherical bearing assembly which is provided with an annular ring of a softer metal than that of the inner race ball member which can be readily replaced from time to time thereby prolonging the operational life of said ball member.

It is still another object of the present invention to provide a spherical bearing assembly in which said first annular ring is provided with at least one groove on its exposed surface which can be engaged by a tool to replace and/or remove said ring from said outer race member.

It is still another object of the present invention to provide a spherical bearing assembly in which the first annular ring is of yieldable plastic material.

It is still another object of the present invention to provide a spherical bearing assembly in which the annular recess provided in the inner surface of the outer members extends beyond the inward facing radial extending face of the annular ring in its fully threaded position, a second annular ring disposed in extended portion of said recess and, the inner surfaces of said first and second annular rings providing more than one-half of the concave spherical surface of said outer race member.

It is still another object of the present invention to provide a spherical bearing assembly in which at least part of the concave inner surface of the outer race member and/or the convex outer surface of the inner race member is coated with a self-lubricating plastic such as "TEFLON", a trademark of the DuPont Corporation.

It is yet another object of the present invention to provide a spherical bearing assembly which can be manufactured using automated high volume techniques.

It is still another object of the present invention to provide a highly efficient spherical bearing assembly which can be inexpensively manufactured and which is simplistic in design.

Embodiments of the bearing according to the concept of the present invention are shown and/or described by way of example in the accompanying drawings and following description of the invention without attempting to show or describe all of the various forms and modifications in which the invention might be embodied; the invention being measured by the appended claims and not by the details of the specification.

DESCRIPTION OF THE INVENTION

Figure 1:
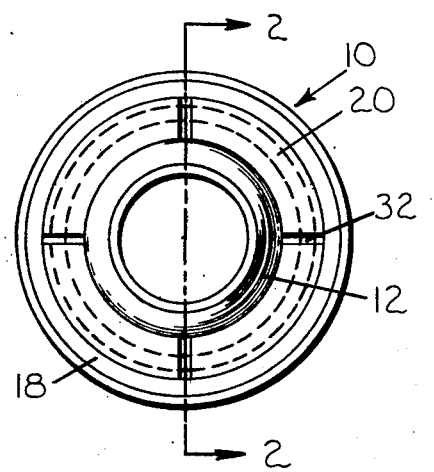
FIG. 1 is a side elevational view of the spherical bearing assembly embodying the present invention with the longitudinal axis of the outer race member and the inner race member being substantially coincident.
Figure 2:
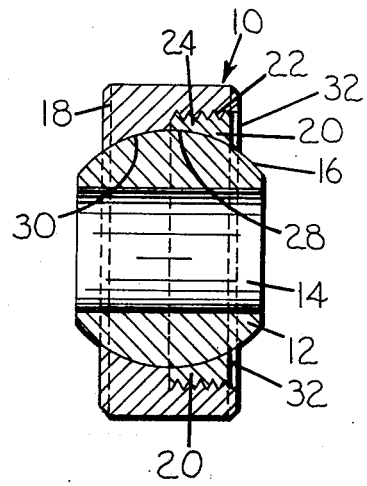
FIG. 2 is a front sectional view taken along line 2—2 of FIG. 1.
Figure 3:
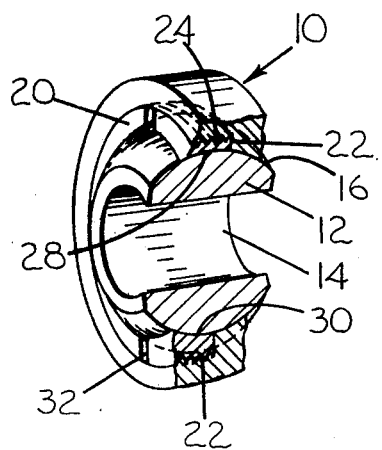
FIG. 3 is a perspective sectional view of the spherical bearing of FIG. 1.
Figure 4:
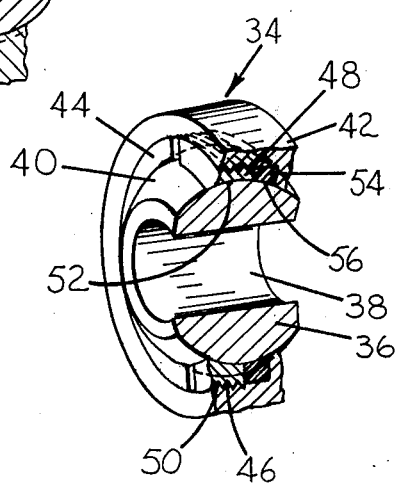
FIG. 4 is a perspective sectional view of a modified form of the spherical bearing in accordance with the present invention.

A spherical bearing embodying the concept of the present invention is generally indicated, as appropriate, by numeral 10 on the attached drawing as set forth in FIGS. 1 through 3, inclusive with a modified form thereof shown in FIG. 4.

The bearing 10 has been shown as a spherical bearing, however, the present invention is also directly applicable to male or female rod end type bearings and the like.

The spherical bearing 10 comprises an inner race member 12 having a central bore 14 therethrough. The inner race member 12 is provided with a convex outer surface 16 and formed in a single body of revolution. It may be noted at this juncture that the inner spherical ball member 12 is similar to the inner race members formed in the prior art.

The basic thrust of the present invention is to be found in the outer member 18 which is also typically formed, in the prior art, as a single solid member. The outer member 18 as distinguished from the outer race members of the prior art is a composite member having several parts. A basic part or member is an annular ring 20. The threaded annular ring 20 is provided on its outer surface with threads 22. The outer race member 18 is also provided with an annular recess 24 which is provided, at its base, with threads complementary to and adapted to be meshed with the threads 22 on the outer surface of the annular ring 20.

The inner surface 28 of the annular ring 20 when it is threaded in place provides approximately one-half of the inner concave spherical surface 30 of the outer race member 18. The remaining portion of the concave spherical surface being formed from and integral with the outer race member 18.

The annular ring 20 may be provided with a plurality of radially extending grooves 32 which can be engaged by a tool (not shown) to threadably insert or remove the annular ring 20 from the outer race member 18. The tool could be an automated device or a simple screwdriver. It has been found that the threading of the ring 20 within the threaded recess 24 is facilitated by the rotation of inner race member 12 is rotated to a position where its central axis is perpendicular to the central axis of the outer race member 18.

The annular ring 20 may be manufactured from the same material as the outer race member 18 or it may be manufactured from formable yieldable plastic such as DELRIN (Trademark of DuPont).

Figure 5:
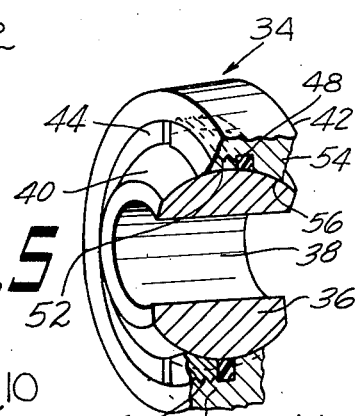
FIG. 5 is a perspective sectional view of another modification of the spherical bearing of the present invention.

Referring now to FIGS. 4 and 5, modified forms of my invention as above described are shown, and in particular, modified forms of a spherical bearing are shown generally indicated by numeral 34.

The spherical bearing 34 is essentially the same as the spherical bearing 10 as shown in FIGS. 1 through 3 in that it comprises an inner race member 36 having a central bore 38 therethrough. The inner race member 36 is provided with a convex outer surface 40 and is formed in a single body of revolution.

As with spherical bearing 10 the basic thrust of the present invention, as it relates to spherical bearing 34, is to be found in the outer race member 42 which is also a composite member having several parts. A basic part or member is a threaded annular ring 44 which is provided with threads 46 on its outer surface. The outer race member 42 is also provided with an annular recess 48 which is partially threaded at its base with threads 50, the threads 50 being disposed toward the open end of the recess. The threads 46 are adapted to mesh with threads 50 such that the annular ring 44 may be threadably placed in or removed from a portion of the recess.

When the annular ring 44 is threadably in place in the recess 48 its inner surface 52 provides a portion of the concave spherical bearing surface complementary to the convex outer surface 40 of the inner race member 36. A second annular ring 54 is disposed in a side-by-side relationship to the annular ring 44. This second annular ring 54 performs several functions, including providing at its inner surface 56 a further portion of the concave spherical bearing surface complementary to the convex outer surface 40 of the inner race member 36. In one embodiment, shown in FIG. 4, the inner surfaces 52 and 56 of the first and second annular rings of 44 and 54 provide more than one-half of the concave spherical surface of the outer race member 42. In an alternative embodiment, shown in FIG. 5, the inner surfaces 52 and 56 of the first and second annular rings 44 and 54 provide approximately one-halve of the concave spherical surface of the outer race member 42.

Additionally the second annular ring 54 could be manufactured from a yieldable plastic material and could be adapted to apply a preloading force to the inner race member. This could be accomplished by providing a slightly oversized annular ring 54 and threading the first annular ring 44 into engagement with the annular ring 54 to apply a preloading force to the inner race member 36. In this manner certain wear may be compensated for by the adjustment of the first annular ring 44 with respect to the second annular ring 54. This adjustment for wear can be accomplished in the field with the bearing in place thereby reducing any down time of the apparatus to which the bearing is operationally attached.

Further the second annular ring 54 can be readily replaced in the field and could be adapted to "take" most of the operational wear by making the rest of the operational components (i.e. the inner race member 36, outer race member 42 and the first annular ring 44) of harder material than the second annular ring 54. Additionally the first annular ring 44 could be made of slightly harder material than the second annular ring 54 but of softer material than the inner race member 36 and the outer race member 42. In this manner the least expensive and most readily replaceable member (i.e. the second annular ring 54) will wear out first and then the first annular ring 44 will have to be replaced at longer intervals and similarly with the inner race member 36 and the outer race member 42.

The various operational bearing surfaces of the spherical bearings 10 and 34 can be coated with suitable self-lubricating plastics such as TEFLON (Trademark of DuPont) to increase the bearing properties of the bearings. The annular rings of the bearings 10 and 34, as before mentioned (i.e. rings 20, 44 and 54) could be manufactured from a wide range of materials, particularly plastics as for example DELRIN.

The remaining components of the bearings 10 and 34 could be manufactured from a wide range of steels and other metals.

Obviously, the present invention is not limited to the specific details as herein described, but is capable of other modifications and changes without departing from the spirit and scope of the appended claims.

I claim:

1. A spherical bearing assembly having a metal inner race member and an outer race member, the inner surface of the outer race member being a concave spherical surface, the outer surface of the inner member being a complementary convex spherical surface, the outer member including an annular recess the base of which is threaded, a first yieldable plastic annular ring having an outer surface threaded with threads complementary to the threads on the base of said recess, said ring threadably received in said recess, a second annular ring also received in said recess in a side-by-side relationship to said first annular ring, the second annular ring being made of a formable and yieldable plastic material, and the first and second annular rings providing a substantial portion which is more than half of the concave spherical surface of said outer race member, said first annular ring operationally capturing said second annular ring and said inner race member within said outer race member.

2. A spherical bearing assembly in accordance with claim 1 wherein the inner surface of said second annular ring is smooth and the portion of said recess which receives said second annular ring is also smooth.

3. A spherical bearing assembly in accordance with claim 1 wherein said second annular ring applies a preloading force to said inner race member.

4. A spherical bearing assembly in accordance with claim 3 wherein said preloading force is effected by threading said first annular ring in intimate contact with said second annular ring.

5. A spherical bearing assembly in accordance with claim 3 wherein said preloading force is effected by providing an oversized second annular ring.

6. The spherical bearing assembly of claim 1 wherein the second annular ring is adapted to apply a preloading force to the inner race member.

7. The spherical bearing assembly of claim 6 wherein preloading force is accomplished by threading the first annular ring into engagement with the second annular ring, whereby wear is compensated by adjusting the first annular ring with respect to the second annular ring.

8. A spherical bearing assembly having a metal inner race member and an outer race member, the inner surface of the outer race member being a concave spherical surface, the outer surface of the inner member being a complementary convex spherical surface, the outer member including an annular recess, the base of which is threaded, a first yieldable plastic annular ring having an outer surface threaded with threads complementary to the threads on the base of said recess, said ring threadedly received in the said recess, a second annular ring also received in said recess in a side by side relationship to said first annular ring, the second annular ring being made of a formable and yieldable plastic material, said first annular ring operationally capturing said second annular ring and said inner race member within said outer race member, the inner surfaces of said first and second annular rings provide approximately one-half of the concave spherical surface of said outer race member.

9. A spherical bearing assembly having a metal inner race member and an outer race member, the inner surface of the outer race member being a concave spherical surface, the outer surface of the inner member being a complementary convex spherical surface, the outer member including an annular recess, the base of which is threaded, a first yieldable plastic annular ring having an outer surface threaded with threads complementary to the threads on the base of said recess, said ring threadedly received in the said recess, a second annular ring also received in said recess in a side by side relationship to said first annular ring, the second annular ring being made of a formable and yieldable plastic material, said first annular ring operationally capturing said second annular ring and said inner race member within said outer race member, the inner surfaces of said first and second annular rings provide more than one-half of the concave spherical surface of said outer race member.

10. A spherical bearing assembly having a metal inner race member and an outer race member, the inner surface of the outer race member being a concave spherical surface, the outer surface of the inner member being a complementary convex spherical surface, the outer member including an annular recess the base of which is threaded, a first yieldable plastic annular ring having an outer surface threaded with threads complementary to the threads on the base of said recess, said ring threadably received in said recess, the inner surface of said first annular ring providing approximately one-half of the concave spherical surface of said outer race member, said first annular ring operationally capturing said inner race member within said outer race member.

* * * * *